US007080013B2

(12) United States Patent
Fellenstein et al.

(10) Patent No.: US 7,080,013 B2
(45) Date of Patent: Jul. 18, 2006

(54) CATEGORIZATION AND RECALL METHODOLOGY FOR PHYSICAL MEDIA IN LARGE CAROUSEL SYSTEMS

(75) Inventors: Craig William Fellenstein, Brookfield, CT (US); Carl Phillip Gusler, Austin, TX (US); Rick Allen Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 10/165,095

(22) Filed: Jun. 6, 2002

(65) Prior Publication Data

US 2003/0229498 A1    Dec. 11, 2003

(51) Int. Cl.
*G10L 21/00*    (2006.01)
*G10L 21/06*    (2006.01)

(52) U.S. Cl. .................. 704/275; 704/270; 704/270.1; 704/272

(58) Field of Classification Search ................ 704/275, 704/270, 272; 368/63; 706/25, 39
See application file for complete search history.

(56) References Cited

U.S. PATENT DOCUMENTS 5,272,273 A * 12/1993 Watanuki et al. ............. 84/649
5,485,197 A    1/1996 Hoarty ............................ 348/7
5,635,728 A    6/1997 Cantu et al. .................. 250/584
5,752,232 A    5/1998 Basore et al. ................ 704/275
5,950,167 A    9/1999 Yaker .......................... 704/275
6,157,725 A *  12/2000 Becker ........................... 381/86
6,201,540 B1 * 3/2001 Gallup et al. ................. 715/764
6,272,457 B1    8/2001 Ford et al. ..................... 704/9
6,445,306 B1 * 9/2002 Trovato et al. ............... 725/38
6,516,359 B1 * 2/2003 Kurihara et al. .............. 710/52
6,584,439 B1 * 6/2003 Geilhufe et al. ............ 704/270
6,587,756 B1 * 7/2003 Moriguchi et al. ............ 701/1
6,665,639 B1 * 12/2003 Mozer et al. ................ 704/244
6,868,382 B1 * 3/2005 Shozakai ..................... 704/254
2002/0067839 A1* 6/2002 Heinrich ..................... 381/110
2002/0103641 A1* 8/2002 Kuo et al. ................... 704/231

OTHER PUBLICATIONS

JVC Instruction Manual for KD-LX50, JVC, pp. 22-38.*

* cited by examiner

*Primary Examiner*—Richemond Dorvil
*Assistant Examiner*—Thomas E. Shortledge
(74) *Attorney, Agent, or Firm*—Duke W. Yee; David A. Mims, Jr.; Brian D. Owens

(57) ABSTRACT

A method and system allowing a user to associate media elements (such as CDs or DVDs) with unique identification tags and channel groupings. A user can cause a given element to be played by voice controlled interface. Speaking the identification tag of a media element causes that media element to play. Speaking a channel tag causes any media element associated with the channel to be played in a pseudorandom manner.

22 Claims, 2 Drawing Sheets

CATEGORIZATION AND RECALL METHODOLOGY FOR PHYSICAL MEDIA IN LARGE CAROUSEL SYSTEMS

BACKGROUND OF THE INVENTION

1. Technical Field

The present invention relates generally to media systems, and more specifically to classifying and accessing media elements within a media system.

2. Description of Related Art

In the art of media storage, finding and accessing individual storage devices becomes increasingly difficult when a greater number of storage elements are stored together. Allowing quick access to the many storage elements in a storage system can become difficult and time consuming.

The best and most familiar examples of technology-driven physical media are found in consumer applications. Particularly, carousels or other storage devices are used, for example, to hold compact discs (CDs) or other playable media types (DVDs, etc.). The typical household may have hundreds or even thousands of such media elements, and with the expected phase-out of linear media (such as video tapes), and their replacement by direct access devices (such as discs), the number of media elements promises to increase.

In many conventional media storage systems, a carousel for example, discs may be inserted and text may be entered to associate a recognizable title with that particular disc. For instance, one may place a CD into slot 137 of a 200 disc carousel. One may then enter text, if desired, through a keyboard to associate a title with that disc. While such techniques are helpful in displaying a visual indicator to the user once a disc is located, the location and retrieval process entails manually searching through the installed media for the desired disc.

SUMMARY OF THE INVENTION

In a preferred embodiment, the innovative system herein described comprises associating individual media elements (compact discs, DVDs, etc.) with an identification tag when placed in a media element storage device (such as a carousel, for example). The identification tag is preferably recorded and stored digitally using components integrated into the player itself.

In a preferred embodiment, when a user wants to play or present a given media element, the user enters the identification tag into the player (or whatever device manages the identification tags). Since the identification tag is associated with the particular media element, that media element can be readily identified from among any number of uniquely identified media elements in a storage system.

In another embodiment of the present innovations, a classification system for associating groups of media elements is taught. These user defined groups form "channels" of related elements, such as a specific type of music or genre of movie, for example.

The identification tags of the present innovations need not be objectively defined, and only need be something that a user finds convenient. For example, a tag could be as specific as to name the artist and composer of a music disc, or be more general or non-descriptive, such as "mix number 2." Likewise, the channel associations can also be arbitrarily assigned by the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
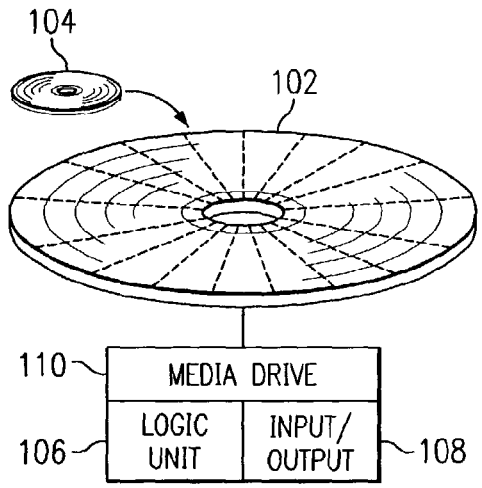
FIG. 1 shows a block diagram of a system consistent with a preferred embodiment.

FIG. 1 shows a media system consistent with a preferred embodiment of the present innovations. Storage device 102 (e.g., a CD carousel) stores several media elements 104 (e.g., CDs). Storage device 102 is connected to a logic unit 106 which preferably includes a processor and memory, input and output 108, and is capable of manipulating and storing information. Media drive 110 provides reading, playing, writing, and/or recording capability for the media, including reading or writing identification index information on the media if applicable. An example of a logic unit consistent with a preferred embodiment would be a computer system designed to accept input, store and manipulate information, and present output to a user.

Following are several embodiments of the present innovations, described in terms of process steps. It should be noted that the innovations can be practiced by varying the depicted process steps, and some process steps may not necessarily be required to practice the present innovations.

Figure 2B:
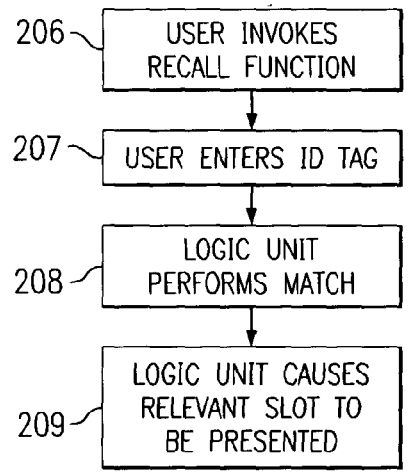
FIG. 2 shows a process flow for a preferred embodiment.
Figure 2A:
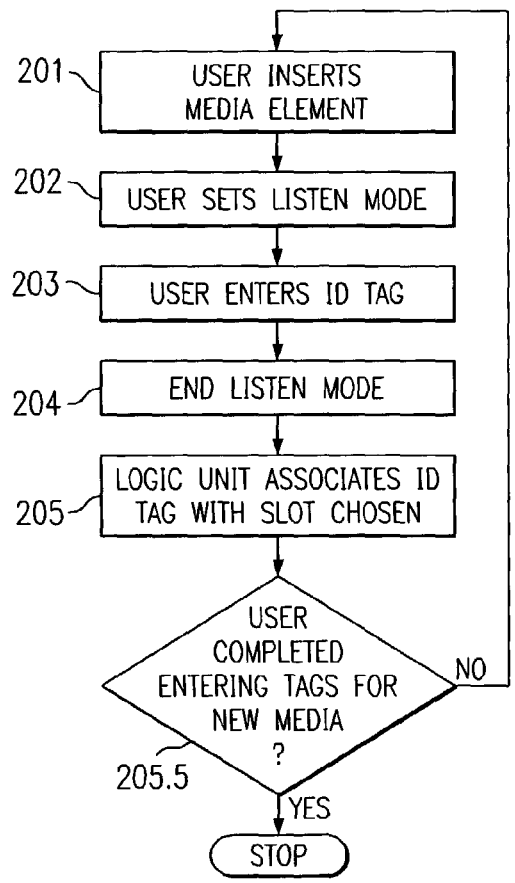

FIGS. 2A and 2B show process steps for "listen mode" and "recall mode," as they are referred to in the present application. FIG. 2A shows a chart of process steps consistent with a preferred embodiment. First, a user inserts a media element (e.g., a compact disc) into an innovative media storage/display system (step 201). The user then sets a logic unit to an input or "listen mode," wherein the logic unit is able to receive input from the user (step 202). The type or form of the input can be of various types, such as keypad data entry or voice recording, or a drop down menu. In a preferred embodiment, the listen mode accepts voice input from the user.

Next, the user enters an identification (ID) tag (step 203) (for example, either verbally or manually) which is recorded by the logic unit. The ID tag can be as comprehensive as the exact title, artist, and performance of the media on the particular media element, or it can be completely subjective or non-descriptive—no objective association is required between the actual content of the media element and the ID tag entered by the user. The concept is predicated on the establishment of a relationship between the ID tag and the media element that the user can easily recall. The logic unit performs extensive validity checking on the input provided by the user, in order to maximize the simplicity of recall. The degree and types of validity checking depend on the nature of the media, and the type or form of input. Validity checking would include validating the uniqueness of the media and the ID tag. This would be especially important with voice tags, where similar words may be pronounced almost identically, or where the same words may be pronounced slightly differently at different times. Step 203 would provide feedback to the user in the case of problems identifying the media, understanding the user's choice of ID tag, resolving similar or identical ID tags, etc. Step 203 would include assisting the user in making changes or choices to resolve any validity or identity problems.

Next, the user ends the listen mode (step 204). The logic unit then creates an association of the ID tag with the specific slot into which the media element was stored (step 205). For example, if a disc was placed into slot #137 of the carousel, and the ID tag input in step 203 was "Party Tunes," then the logic unit will store the association of slot #137 and "Party Tunes" in memory.

Next, if the user plans to enter more names for more media elements, (step 205.5), the process begins again at step 201. If not, the data entry process ends.

FIG. 2B shows process steps consistent with a recall mode. After some time passes, the user wishes to play the CD labeled "Party Tunes." Without needing to remember which slot into which that disc was placed, the user can invoke a recall function on the logic unit or media system (step 206) and enter the ID tag associated with the slot of that media element (step 207). As in step 203, the ID tag can be entered either verbally or manually. In response, the logic unit performs a matching effort between the new request and the existing speech tags (step 208). This results in the media element located in slot #137 being presented (step 209) for playback, reading, writing, or any other function desired.

The above process steps depict a first embodiment, wherein ID tags are entered and associated with a particular slot or storage space in a media element storage device. Another embodiment differs in that the ID tag entered by the user is not associated with a particular slot or storage area in the media system, but is instead associated with the media element itself in a long term association that is preferably retained by the logic unit for an indefinite duration (until altered by the user, for example).

Figure 3A:
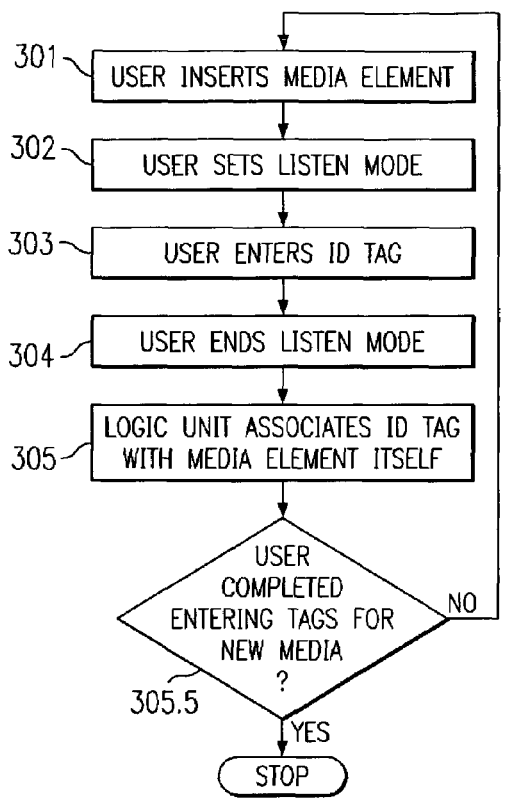
FIG. 3 shows a process flow for a preferred embodiment.
Figure 3B:
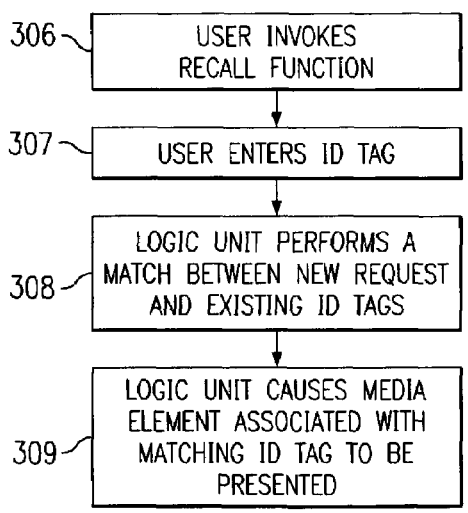

FIGS. 3A and 3B show process steps consistent with a preferred embodiment, again demonstrating a listen mode and a recall mode.

FIG. 3A depicts a flowchart of process steps for listen mode. First, as in the previous embodiment, the user inserts a media element into the media system (step 301). The user then sets a logic unit to an input or "listen mode," wherein the logic unit is able to receive input from the user (step 302).

Next, the user enters an identification (ID) tag (step 303) (for example, either verbally or manually) which is recorded by the logic unit. As stated above, the ID tag can be very specific or general. The concept is predicated on the establishment of a relationship between the ID tag and the media element that the user can easily recall. As stated above, the logic unit performs extensive validity checking on the input provided by the user, in order to maximize the simplicity of recall. The degree and types of validity checking depend on the nature of the media, and the type or form of input. Validity checking would include validating the uniqueness of the media and the ID tag. This would be especially important with voice tags, where similar words may be pronounced almost identically, or where the same words may be pronounced slightly differently at different times. Step 303 would provide feedback to the user in the case of problems identifying the media, understanding the user's choice of ID tag, resolving similar or identical ID tags, etc. Step 303 would include assisting the user in making changes or choices to resolve any validity or identity problems.

Next, the user ends the listen mode (step 304). The logic unit then associates the ID tag entered by the user with a specific (preferably unique) identifier of some kind (e.g., indices or text tracks) on the media element itself (step 305). This would create a "permanent" (though overwriteable) association between the individual media element and the ID tag entered by the user in step 303.

Next, if the user plans to enter more names for more media elements, (step 305.5), the process begins again at step 301. If not, the data entry process ends.

FIG. 3B shows process steps for recall mode consistent with a preferred embodiment.

Later, the user wishes to play the particular media element. The user invokes a recall function of the logic unit or media system (step 306) and the user speaks or otherwise enters the ID tag (step 307). In response, the logic unit performs a matching effort between the new request and the existing ID tags (step 308). This results in the media element with the proper ID tag association being presented (step 309) for playback, reading, writing, or any other function desired.

In another embodiment of the present innovations, the user has the option to move media elements to different media storage locations (e.g., from one slot to another in a carousel) while still maintaining the same ID tag association with the media element. This innovative process implements a similar process to that shown in FIG. 3.

Figure 4:
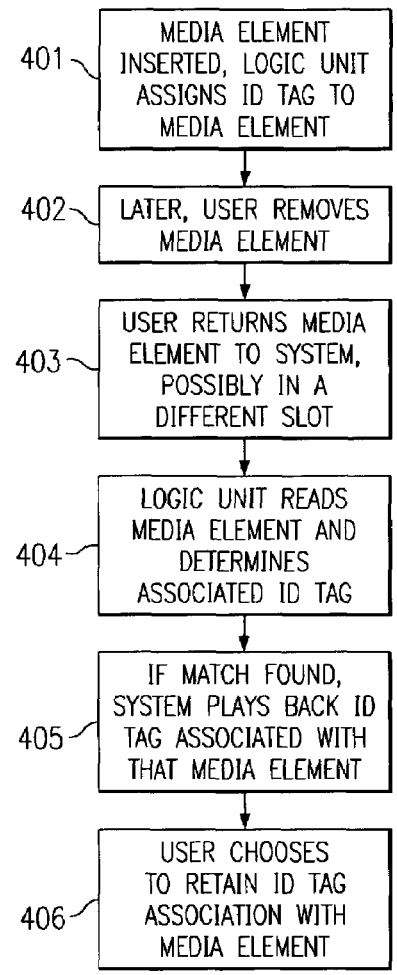
FIG. 4 shows a process flow for a preferred embodiment.

FIG. 4 shows the innovative process steps. As in the previous embodiment described in FIG. 3, the media element is inserted and the logic unit is used to assign an ID tag to the media element itself (collectively, step 401). After the media element is associated with an ID tag, the user removes the media element from the media system (step 402). At a later time the user returns the media element to the media system, but in a different location (e.g., a different slot of a CD carousel) (step 403). The logic unit of the media system reads the ID tags from the media element (e.g., indices or text tracks) and performs a lookup on "previously known" media elements (i.e., the list of media elements that have already had such an ID tag-to-media element association created) (step 404). If a match is found, the media system plays back the speech tag previously assigned to that media element (e.g., "Party Tunes" is presented on a text display, or through an audio system, for example) (step 405). Either through default acceptance or some user indication of acceptance (e.g., push a button or speak a sound), the user chooses the keep the extant ID tag associated with the media element, which is now in a different slot than it was when originally associated with the ID tag (step 406). The media element is once again accessible to the user by simply inputting the ID tag.

If a user wishes to reassign the ID tag on the media element, then in step 406 the user makes some indication of non-acceptance. In this case, the logic unit presents the option to assign a new ID tag to the media element.

In another embodiment of the present innovations, the logic unit has optional replies to a user input request. For example, if the user inputs an ID tag to request a particular media element be presented, and the logic unit cannot understand or otherwise fails to match the input ID tag with a stored media element, then the logic unit presents the user with a message indicating the failure. It can also return a list of similar matches that were found, allowing the user to select from the list. One useful variation for this embodiment is for the logic unit to repeat the user's input back to the user at the beginning of a search, so the user can tell if the failure to find the desired media element is because the element is not present in the media system or because the logic unit incorrectly interpreted the user's input of the ID tag. Failure to find a media element could result, for example, if the disc is not located in the media system, or if the hamming distance between the requested tag and the available stored tags is over some threshold value. Substantially equivalent matches can return the closest match, or surrounding matches as well, presenting the user with options to choose which media element they want to display.

In yet another embodiment, the innovative system includes user defined "channels" for the media system. For example, in addition to retrieval information which may be encoded and associated with a particular media element, classification information can be encoded to describe categories for future playback purposes. Categories or channels can be assigned in the same manner as the ID tags are assigned, but they need not be. For example, there could be software-assigned buttons to select a channel via drop down menu.

A channel can consist of an individual category or grouping, or a channel can be made up of multiple other channels or categories. Individual channels (indicated by a common association to a given ID tag, for example) can be grouped to form other unique channels.

This innovation is useful in that, as such media system archives grow in size and the number of elements enters the hundreds and thousands, a user can create pseudorandom play by selecting a particular channel. All media elements within the channel selected can be randomly selected from, for example.

Examples of such channels that might be used in an audio media system include such categories as jazz, classical, Celtic, bluegrass, etc. Selecting one of these channels causes the logic unit to randomly (or sequentially, or otherwise, if desired) select a media element or part thereof for play.

This innovation has the benefit of creating unique groupings between media elements that are not in close physical proximity in the media system, i.e., the media elements need not be in contiguous slots in a carousel, for example. As stated above, these channels can be combined into other channels, so that, for example, random play among only bluegrass and country channels is selected.

In one embodiment of the above described innovation, individual media elements or storage slots are associated with a plurality of channels. For example, one media element might have content which a user would classify as both "Easy Listening" and "Classical." In this case, the user can assign both tags to the slot or media element, so that when pseudorandom play is invoked in either the "Easy Listening" or "Classical" channels, the dual-labeled media element will be included in the potential selections.

This categorization and recall methodology, preferably for media in large carousel systems but not limited to such systems, describes a specific invention related to entertainment media as would be found in the home, such as compact discs and digital video disks. However, the concepts herein described are applicable to a variety of media types in a large "jukebox" or carousel storage device, such as may be found in either home or industrial/business use. Hence, the ideas disclosed herein are applicable in disparate fields involving media categorization.

It should further be noted that the media cabinet descriptors of "jukebox" or "carousel" are not intended to limit the ideas herein to specific layouts or devices in a circular or other specific geometric arrangements.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A media system, comprising:
   a media device capable of holding a plurality of media elements and displaying content of the plurality of media elements;
   a logic unit connected to control the media device, the logic unit having a voice input;
   wherein the logic unit stores a plurality of identification tags, wherein the plurality of identification tags are user specified using the voice input; and
   wherein the logic unit maintains user assigned associations between individual media elements of the plurality and individual identification tags of the plurality, wherein the individual media elements remain associated with individual identification tags even if the media elements are moved.

2. The media system of claim 1, wherein when a user enters an identification tag of the plurality via the voice input, the logic unit causes the media device to display the content of an associated media element of the plurality.

3. The media system of claim 1, wherein the plurality of identification tags are text tags.

4. The media system of claim 1, wherein the logic unit further comprises an output for displaying association information to a user.

5. The media system of claim 1, wherein the media elements of the plurality contain audio content.

6. The media system of claim 1, wherein the logic unit maintains associations between groups of media elements and group identification tags such that upon receiving a group identification tag as input, the logic unit causes random play of a media element from a group associated with the input group identification tag.

7. A method of media access, comprising the steps of:
   storing a plurality of media elements in a media system;
   associating media elements of the plurality with identification tags specified by a user to form a plurality of associated identification tags, wherein the associated identification tags are voice inputs and, wherein the media elements remain associated with the identification tags even if the media elements are moved;
   when a user invokes a recall function using a voice input and submits a first identification tag, comparing the first identification tag with the plurality of associated identification tags;
   if the first identification tag is substantially equivalent to an identification tag of the plurality, presenting a media element associated with the first identification tag.

8. The method of claim 7, wherein the step of presenting the first media element comprises displaying the content of the first media element.

9. The method of claim 7, wherein the steps of associating end comparing are performed by a logic unit.

10. A voice controlled media display system, comprising:
    a media unit having storage locations for a plurality of media elements and a logic unit which is at least partially controlled by voice input from a user;
    wherein the logic unit associates individual user-input identification tags with individual media elements of We plurality;
    wherein the individual user-input identification tags are specified using voice input from the user and the individual user-input identification tags remain associated with the individual media elements of the plurality even if the media elements are moved;

wherein the logic unit associates individual channel tags with groups of media elements of the plurality;

wherein when a user enters an identification tag, the media unit displays the associated media element; and wherein when a user enters a channel tag, the media unit displays one media element from a group of media elements associated with the channel tag.

11. The media system of claim 10, wherein the channel tags are determined from existing information on a media element.

12. The media system of claim 10, wherein the channel tags are user-input.

13. The media system of claim 10, wherein a media element of the plurality can be associated with more than one channel tag.

14. The media system of claim 10, wherein displaying a media element includes playing audio content of the media element.

15. The media system of claim 10, wherein a user can invoke random play from among all media elements associated with a first channel tag using a voice input command.

16. A voice controlled media display system, comprising:
a media unit having storage locations for media elements and a logic unit which is at least partially controlled by voice input from a user;
a plurality of channel tags stored by the logic unit, wherein each channel tag of the plurality is associated with at least one media element;
wherein a user can input a channel tag to cause an associated media element to be played;
where a first channel tag of the plurality is associated with multiple media elements and remains associated even if the multiple media elements are moved; and
wherein invoking the first channel tag of the plurality causes random play of media elements associated with the first channel tag.

17. The system of claim 16, wherein a user associates individual media elements with each of the plurality of channel tags.

18. The system of claim 16, wherein the at least one media element may be associated with multiple channels tags within the plurality of channel tags by the user.

19. A method of media access, comprising the steps of:
storing a plurality of media elements in a media system;
associating media elements of the plurality with identification tags specified by a user to form a plurality of associated identification tags, wherein the associated identification tags are voice inputs entered while the media system is in a listen mode and, wherein the media elements remain associated with the plurality of associated identification tags indefinitely even if the media elements are moved;
responsive to a user invoking a recall function using a voice input and submitting a first identification tag, comparing the first identification tag with the plurality of associated identification tags; and
responsive to the first identification tag being substantially equivalent to an identification tag of the plurality, presenting a media element associated with the first identification tag.

20. The method of claim 19, wherein moved is at least one of moved between media slots of the media system, removed from the media system, and inserted into the media system.

21. The method of claim 19, wherein the presenting step is at least one of playing the media element, reading the media element, and writing to the media element.

22. The method of claim 19, further comprising:
responsive to inserting a media element back into the media system, identifying an associated identification tag associated with the media element;
responsive to identifying an associated identification tag associated with the media element, playing back the associated identification tag to the user; and prompting the user to change or accept the associated identification tag associated with the media element.

* * * * *